United States Patent [19]

Larsen et al.

[11] 3,891,605

[45] June 24, 1975

[54] BROMINATED PENTAERYTHRITOLIC POLYESTERS AND PROCESS THEREFOR

[75] Inventors: Eric R. Larsen; Ernest L. Ecker, both of Midland, Mich.

[73] Assignee: The Dow Chemical Company, Midland, Mich.

[22] Filed: Apr. 4, 1974

[21] Appl. No.: 457,951

[52] U.S. Cl. ............. 260/75 H; 260/76; 260/77; 260/869
[51] Int. Cl. ............... C08g 17/003; C08g 17/12
[58] Field of Search .............. 260/75 H, 76, 77

[56] References Cited
UNITED STATES PATENTS

| | | | |
|---|---|---|---|
| 3,507,933 | 4/1970 | Larsen et al. | 260/293.65 |
| 3,640,864 | 2/1972 | Steward et al. | 252/62.3 |
| 3,697,625 | 10/1972 | Smith et al. | 260/869 |
| 3,700,957 | 10/1972 | Daniels | 260/31.6 |
| 3,826,806 | 7/1974 | Comstock et al. | 260/869 |

*Primary Examiner*—Melvin Goldstein
*Attorney, Agent, or Firm*—Ralph M. Mellom

[57] ABSTRACT

A variety of brominated polyester resins using pentaerythritol as one of the components are prepared by the novel process of brominating the pentaerythritol concurrently with polyester formation under conditions whereby generation of large amounts of waste hydrobromic acid is avoided, process steps are saved, and technical grade pentaerythritol can be used, all of which results in large energy savings. The resins which are made by this process include brominated saturated and unsaturated polyester resins, and vinyl ester resins.

20 Claims, No Drawings

BROMINATED PENTAERYTHRITOLIC POLYESTERS AND PROCESS THEREFOR

BACKGROUND OF THE INVENTION

Bromine-containing polyesters are known in the art. However, the known processes are complex and expensive, and result in undesirable waste streams - notably aqueous hydrobromic acid.

The use of reactive halogenated materials as flame retardants in unsaturated polyester resins is known. See, for example, J. W. Lyons, *The Chemistry and Uses of Fire Retardants*, Wiley-Interscience, New York, 1970, pp. 370–398. Thus for example, phthalic anhydride may be chlorinated to give tetrachlorophthalic anhydride, which may be subsequently polymerized with maleic anhydride and propylene glycol to yield an unsaturated polyester resin. This resin may subsequently be dissolved in a monomer such as styrene to yield an unsaturated polyester resin cross-linkable system. Polymerization of this mixture yields a hard, infusible material having desirable physical properties. Similarly, chlorendic anhydride and tetrabromophthalic anhydride may be prepared and subsequently cooked into a polyester resin. See for example U.S. Pat. No. 3,285,995.

Other methods of introducing halogen into the unsaturated backbone of polyesters are known. See, for example, U.S. Pat. Nos. 3,536,782 and U.S. 3,507,933. The prior art teaches, for example, that an unsaturated polyester resin may be prepared from maleic anhydride, tetrahydrophthalic anhydride, and a glycol. This resin is subsequently dissolved in an inert solvent such as methylene chloride, and elemental bromine is added so as to brominate the unsaturation in the tetrahydrophthalic function. After the bromination is complete, the solvent may be stripped off and the bromine-containing resin dissolved into the monomer to form the cross-linkable system. The bromine may also be incorporated into the unsaturated backbone of a polyester resin by preparing a bromine-containing glycol such as dibromoneopentyl glycol (DBNPG), 2,3-dibromobutene-1,4-diol, etc. and subsequently reacting these diols with an unsaturated anhydride such as maleic anhydride and a saturated aliphatic or aromatic acid or anhydride such as adipic acid or phthalic anhydride, to yield a brominated resin. Dissolution of this resin in a monomer yields a cross-linkable unsaturated polyester resin.

Similarly, bromine-containing saturated polyesters are known in the art. See, for example, U.S. Pat. No. 3,700,957 which discloses flame retardant polyester plasticizers which are prepared by esterification of a dicarboxylic acid, a glycol and dibromoneopentyl glycol.

A preferred method of producing a fire retardant polymer is to produce a polyester having a high halogen content and then blend this polymer with another polymer to yield a final polymer having just enough bromine and/or chlorine to give the necessary degree of fire retardancy to the finished product.

In general, the prior art methods of introducing halogen into the backbone of a polyester polymer all have certain common and undesirable characteristics. First, they all require two or more process steps in that there must be a preparation and isolation of the fire retardant agent (such as the preparation of dibromoneopentyl glycol from HBr and pentaerythritol), and there must be a subsequent preparation and isolation of the polymer itself. Second, the overall reaction efficiencies of these processes, and especially their bromine efficiencies, are undesirably low. Finally, the prior art processes generate undesirable and potentially polluting waste streams.

Of the fire retardant polyester polymers mentioned above, the most desirable appear to be those in which the halogen is located on an aliphatic carbon atom not adjacent to a carbon atom having a carbon-hydrogen bond. Polymers of this type have been shown to have outstanding photochemical and thermal stability. Polymers of this type may be prepared from dibromoneopentyl glycol as described in U.S. Pat. No. 3,507,933 and 3,700,957. The preparation of these polymers is a two-step synthesis. In the first step, penetaerythritol is reacted with hydrogen bromide and converted to the dibromohydrin of pentaerythritol (dibromoneopentyl glycol or DBNPG). A number of methods are known in the art for preparing this product, with yields of DBNPG varying from 50% (according to U.S. Pat. No. 3,607,953) to about 70%. The low yields result from the loss of pentaerythritol which ends up as either the monobromohydrin or the tribromohydrin. Additionally, if the yield of DBNPG is to be maximized, it is necessary to employ about a 15–50% excess of hydrogen bromide in the reaction over and above the theoretical amount. The maximum hydrogen bromide efficiency obtained in these reactions according to the prior art is about 70%. The DBNPG is then reacted with dibasic acids as described in U.S. Pat. Nos. 3,507,933 and 3,700,957. Reaction times for this second step in preparing the polyester from DBNPG is on the order of 5 to 8 hours or longer, and depends greatly upon the temperature at which the process is carried out.

Finally, it is necessary to employ the more costly purified pentaerythritol in the conventional processes for preparing dibromoneopentyl glycol rather than the standard commercial technical grades which may contain from 10–25 wt. % dipentaerythritol. The presence of significant amounts of dipentaerythritol can severely retard hydrobromination in the conventional processes and thus tends to promote the formation of tetrabromoneopentane with its attendant odor problems, and promotes the formation of color bodies in the dibromoneopentyl glycol. The presence of the dipentaerythritol causes other problems when present in significant amounts. As indicated, if pure dibromoneopentyl glycol is to be prepared, the bromohydrins formed represent a loss of valuable raw materials and the generation of significant brominated organic waste streams, disposal of which is both difficult and expensive.

In addition to dipentaerythritol, commercial technical grade pentaerythritol contains variable amount of "formals," i.e. condensation products formed by the reaction of the hydroxyl groups on the pentaerythritol, and dipentaerythritol with formaldehyde, which tend to form highly colored byproducts during the hydrobromination process. The formation of these color bodies is detrimental to the use of these bromohydrins, in such applications as unsaturated polyester resins, and requires complex and expensive purification.

As shown in example 20, below, technical grade pentaerythritol containing dipentaerythritol may be readily employed in the present process without these detrimental results.

SUMMARY OF THE INVENTION

It has now been discovered according to the present invention that useful fire retardant polyesters may be prepared by reacting pentaerythritol in the liquid phase with HBr and a dicarboxylic acid or acids having at least 4 carbon atoms in the molecule and mixtures thereof, and under conditions where bromine replaces some of the hydroxyls of the pentaerythritol at the same time that a controlled amount of polymerization is taking place as a result of the reaction between the pentaerythritol and the dibasic acids. Polyesters are produced which have suppressed ignition properties and rate of flame spread in the presence of small scale ignition sources as determined by the standard tests employed. It is recognized, however, that all known organic polymers will burn when subjected to a sufficiently intense heat source. Dicarboxylic acids is herein meant to include the anhydrides, esters and halides thereof. Pentaerythritol, as used herein, includes pentaerythritol that has been partially halogen substituted and technical grade pentaerythritol. This reaction may be catalyzed and/or chain terminated using a saturated monocarboxylic acid or anhydride having at least two carbon atoms in the molecule. As a further option, this fire retardant polyester "concentrate" can be sequentially reacted with additional dibasic acids and other alcohols and polyols such as propylene glycol, to end up with a polyester system that has a selected degree of fire retardancy. Preferred alcohols and polyols would be those having up to 10 carbon atoms in the molecule. Substantial hydrobromination of the pentaerythritol, i.e., 95% or more of the amount of hydrobromination desired, should be effected before addition of the other hydroxyl-containing compounds. Otherwise, bromination of such other compounds may take place. As such brominated products are not as stable as the brominated pentaerythritolic products, they should be kept to a minimum.

The dibasic acids and the hydrogen bromide may be added to the reaction mixture in any order, or simultaneously. Regardless of the order, preferably both components should be introduced into the reaction mixture within a short time of each other. If the dibasic acid is added in the form of the anhydride or if water is removed as the reaction between the dibasic acid and the pentaerythritol proceeds, prior to the addition of the hydrogen bromide, care must be taken to prevent the mixture from becoming overly viscous. When the hydrogen bromide is added first, the dibasic acids should be added to the reaction mixture before the HBr to water weight ratio falls below about 0.9 HBr to 1.0 water in order to avoid side reactions and formation of excessive color bodies and preferably this ratio should not fall below about 1.2 HBr to 1.0 water. Below this ratio, the rate of hydrobromination becomes extremely slow and the side reactions then become predominant, causing these excessive color bodies. Removal of the water prior to addition of the dibasic acids likewise causes this ratio to fall because hydrogen bromide will be removed along with the water in the absence of the dibasic acids. By adding the dibasic acids before the ratio falls to the undesirable level, the water may be removed without concurrent HBr removal, thus maintaining the HBr to water ratio above at least 0.9 to 1.0 until the hydrobromination reaction is substantially complete, i.e., 95% or more of the amount of hydrobromination desired.

When water is used as a solvent at the outset of the process, as it may be to increase HBr addition rate, such additional water must be taken into account along with the water formed as a reaction by-product in this regard.

All manner of novel, brominated pentaerythritolic resins may be made by use of the process of the present invention. Thus, novel, unsaturated, brominated, pentaerythritolic polyesters having properties superior to similar, known polyesters may be prepared. Similarly, saturated brominated, pentaerythritolic polyesters may also be economically prepared by this new process.

Novel vinyl polyesters of the brominated pentaerythritolic variety can also be prepared using the process of this invention. For example, pentaerythritol, HBr, and adipic acid may be reacted to yield a saturated polymer. Commonly used polymers which may be made by this invention are those having a molecular weight in the range of from about 800 to about 1500. A second glycol such as propylene glycol or dibromoneopentyl glycol or the corresponding alkylene oxides may then be reacted in appropriate amount to yield a polymer having both ends capped by hydroxyl. This polymer may then be reacted with methacrylic acid, acrylic acid or their anhydrides or acid chlorides under relatively mild conditions with an inert water-azeotroping solvent such as 1,2-dichloroethane. Preferably, the endcapping operation is catalyzed with sulfuric acid, or the like, to increase the reaction rate.

The process of this invention differs from the known art in that the reaction is run so that the pentaerythritol, HBr and the acids are employed as the raw materials and the brominated polyester is produced directly without isolating any intermediate products. Such a process has substantial advantages over the prior art. For example, the reaction may be carried out in a single reactor; isolation and purification of chemical intermediates are not necessary; overall reaction times are considerably reduced and are equivalent to those required for the production of polymers from DBNPG alone; loss of pentaerythritol as the monobromo hydrin and tribromo hydrin is eliminated; loss of the bromohydrins of di and tripentaerythritol is eliminated; hydrogen bromide and energy efficiencies are greatly increased; waste HBr-water solutions are not generated, or are generated in minute amounts; the initial colors of the resins are greatly improved; and polymer concentrates having very high halogen contents are readily, and inexpensively available.

The process of this invention produces a low polymer of pentaerythritol ester prior to completion of hydrobromination. In the prior art approach, the brominated glycol is made and isolated first and then reacted with dibasic acids to produce a polymer. This difference in technique is believed to produce a more or less branched chain polymer in the process of the present invention as opposed to the conventional linear polymer produced by the prior art. The new polymers are demonstrable by their improved physical characteristics as will be shown below.

The products of the invention are brominated polyesters but may contain some chlorine provided that the starting pentaerythritol is a chlorinated derivative or that the acids used are chlorine-substituted derivatives.

Further, the presence of minor amounts of HCl in the HBr, i.e. up to about 10% is not detrimental.

Dicarboxylic acids which have 4 to 20 carbon atoms are preferred in this invention. Especially preferred for use are those dicarboxylic acids having 4 to 10 carbon atoms.

Of the aliphatic dicarboxylic acids that are unsaturated and suitable for use in the present invention are maleic, fumaric, itaconic, citraconic, and tetrahydrophthalic acids and their anhydrides along with halogenated derivatives of the same. Especially preferred because of its low cost and desirable effectiveness is maleic anhydride.

The saturated dicarboxylic acids which may be used in the form of their esters, anhydrides or halides, are, for example, succinic acid, chlorosuccinic acid, adipic acid, sebacic acid, phthalic acid, isophthalic acid, terephthalic acid, tetrachlorophthalic acid, hexachlorendomethylene-tetrahydrophthalic acid, hexahydrophthalic acid, and the like. The dicarboxylic acids that are especially preferred because of their low cost and effectiveness are adipic, azelaic and phthalic. In conjunction with the aforesaid dibasic carboxylic acids there may be used monobasic saturated aliphatics (having at least 2 carbon atoms) or cycloaliphatic, aromatic or halogen-substituted carboxylic acids, for example, acetic acid, propionic acid, butyric acid, benzoic acid, chlorobenzoic acid, chloroacetic acid, and the like in an amount of up to about 0.80 of a mole per mole of pentaerythritol, preferably at a carboxyl to hydroxyl ratio of from about 0.02 to 1 to about 0.10 to 1. These monobasic acids, and especially acetic acid are useful in the present invention in that they can act as a catalyst for the bromination of the pentaerythritol as well as a chain shortener where desired. By monocarboxylic acid is meant the anhydride and acid chloride form as well.

Solvents are not required except as necessary to maintain the liquid phase or to attain better temperature control in some circumstances. Similarly, water in small amounts as a solvent will facilitate the addition of HBr to the reaction mixture at lower process temperatures (compare, for example, Examples 2 and 4 below, in this regard). However, the best resins in initial color and light stability are obtained when a solvent, such as tetrachloroethylene, water, xylene (o, p, m), toluene, ethylene dibromide, ethylene dichloride, tetrachloroethane, chlorobenzene, and the like, is used. Other inert solvents, i.e., those which do not react with hydrobromic acid, are usable and especially those solvents which boil between 80° and 200°C. Of greatest interest because of their effectiveness and low cost are perchloroethylene and water. Of course, any of the solvents may be used alone or in combination.

As previously indicated, other polyhydric alcohols may be added during the reaction but after hydrobromination of the pentaerythritol is substantially complete. The number of these that may be used is very large. Among the more common ones that may be listed, for example, are ethylene glycol, polyethylene glycols, propylene glycol, butylene glycol, hexane-diol, butene-diol, 2,2-dimethylpropanediol-1,3, 2,3-dibromobutenediol-1,3, mono- and polycyclic alcohols such as dimethylol cyclohexane and tricyclo-decane-di- or tri-methylol, glycerine, and the like.

Monohydric alcohols may also be used partly for the same reason that mono-basic acids may be used, i.e., in order to moderate the polymer chain and reduce the viscosity of the system. These may include methyl, ethyl, propyl, butyl, benzyl, ethyl-hexyl, allyl, oleyl, chloroethyl or tricyclo-decane mono-methyl alcohols. These are especially desirable in the manufacture of polyester plasticizers of the kind described in U.S. Pat. No. 3,700,957.

The process of this invention involves carrying out two chemical reactions, i.e. (1) the hydrobromination of an alkyl hydroxy group and (2) the esterification of an alkyl hydroxy group.

(1) ROH + HBr ⟶ RBr + H$_2$O 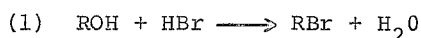

(2) ROH + -CO$_2$H ⟶ R-OC- + H$_2$O 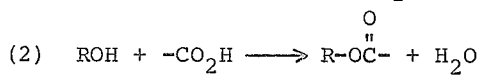

Because of the polyfunctionality of the various ingredients, the quantities employed may be expressed on an equivalent weight basis rather than on the conventional molar basis. An equivalent weight of a substance is defined as the molecular weight divided by the functionality, e.g. the equivalent weight of pentaerythritol is 136 g-molecular weight divided by 4 or 34 g. Similarly, the equivalent weight of maleic anhydride is 49 g. In the case of hydrogen bromide since it is monofunctional for the purpose of reaction (1) its molecular weight and equivalent weight are the same. It is obvious that one equivalent weight of pentaerythritol will react with one equivalent weight of HBr to yield one equivalent of alkyl bromide. In the examples, below, equivalents and/or mole ratios will be used.

Preferably, the brominated polyester is made using only pentaerythritol as the hydroxyl component. Where such a resin is made in its unsaturated form, it may then be blended with one or more unsaturated polyesters. When the resins are made separately in this manner, it appears that a better initial color and a much better light stability results. However, the practice of this invention encompasses the adding of other polyhydric and monohydric alcohols directly into the reaction after substantial hydrobromination of the pentaerythritol is completed to react with dibasic acids.

The compositions prepared in accordance with this invention, which include the bromine-containing unsaturated polyester resins alone and also the blends of such resins with other polyesters, may be cured to insoluble, infusible products by polymerization with monomers such as vinyl aromatic compounds or alkyl esteers of acrylic or methacrylic acid. Such products possess good mechanical properties, are flame retardant to self-extinguishing and are highly resistant to discoloration upon prolonged exposure to light.

The monoethylenically unsaturated monomer to be employed as the olefinic cross-linking agent can be a vinyl or vinylidene monomer such as styrene, vinyltoluene, vinylxylene, ethylstyrene, isopropylstyrene, tert.-butylstyrene, fluorostyrene, chlorostyrene, dichlorostyrene, bromostyrene, vinyl bromide, vinylidene chloride, ethyl acrylate, methyl methacrylate, butyl methacrylate, 2-ethylhexyl acrylate, propyl acrylate, isobutyl acrylate, methyl acrylate, butyl methacrylate, 3-bromo-2,2-bis(bromomethyl)propyl methacrylate, or mixtures of any two or more of such vinyl or vinylidene compounds. The ethylenically unsaturated monomers are employed in an amount of from about 25 to about 60% by weight of the composition. Best results are usually obtained by employing approximately 1–8 equivalents of the monomer for each equivalent of ethylenic double bond in the polyesters used.

A preferred procedure for making the compositions of the invention comprises introducing the selected ingredients, i.e., the dicarboxylic acid or acids, the pentaerythritol, the solvent and optionally, mono-basic acid into a suitable esterification reaction vessel equipped with heating and/or cooling means, an agitator, means for maintaining an atmosphere of an inert gas such as nitrogen, helium, or carbon dioxide, over the reaction mixture, means for removing water of esterification suitably as it is formed in the reaction, and other accessories to the reaction. The reactants are blanketed with an inert atmosphere, preferably nitrogen gas, and agitated and heated to effect the reaction for a desired period of time. The degree of reaction is conveniently determined by employing the acid number technique or by measuring the amount of water liberated in the reaction. The reaction is discontinued when the product has the desired acid number, e.g., an acid number of 75 or below. The bromine-containing polyester is cooled and thereafter may be mixed with other unsaturated polyesters prepared in a similar way and the aliphatic monomers, at room temperature or thereabout, and in the desired proportions. Alternatively, the bromine-containing polyester may have added thereto additional dicarboxylic acid moieties along with other diols to produce a brominated unsaturated polyester resin having a more or less uni-structured polyester resin with the desired degree of bromination.

Alternatively, the unsaturated bromine-containing polyester can be advantageously mixed with the olefinic monomer at elevated temperatures, thereby facilitating solution and mixing of the materials with one another. To prevent premature polymerization at this stage, a polymerization inhibitor is advantageously added to the mixture or to one of the components of the mixture prior to mixing, especially if the mixture is to be stored, or shipped in commerce, prior to its being cured or polymerized to insoluble, infusible, polyester resinous product. The curing is usually effected in the presence of a catalyst or initiator for the polymerization such as an organic peroxygen compound, e.g., benzyl peroxide, tert.-butyl hydroperoxide, and the like. The activators or catalysts can be employed in amounts of from about 0.01 to about 5% by weight of the monomers.

The polymerizable or curable polyester compositions of the invention are useful as intermediates or starting materials in the preparation of other more complex polyester compositions, e.g., in the preparation of lacquers, or varnish resins, or enamels, but are preferably and advantageously employed as compositions of polymerizable polyesters comprising the unsaturated bromine-containing polyester in amounts sufficient to form a self-extinguishing product when mixed with one or more other ethylenically unsaturated polyesters, which total polyester ingredients are intimately blended or mixed with one or more olefinic monomers copolymerizable with the unsaturated polyesters to form insoluble, infusible, resinous products. Such compositions and products are useful for a variety of purposes in the home and industry such as the preparation of glass fiber or glass cloth reinforced laminates, as potting resins, as electrical insulating resins, as coatings for wood, metal or plastic objects, and which compositions possess good resistance to discoloring upon exposure to light and range from fire retardant to self-extinguishing products.

Additaments such as fillers, pigments, dyes, antioxidants, stabilizers or plasticizers, e.g., triethyl phosphate, can be added, but are not required.

The HBr should be employed in such stoichiometric amounts so as to react with the desired number of hydroxyls of the pentaerythritol. Depending upon the degree of polymerization desired, the mole ratio of the HBr to the pentaerythritol should be from about 1.8 to 1 about 2.4 to 1. As can be readily seen, if this molar ratio significantly exceeds that of 2 HBr to 1 pentaerythritol, polymerization will not be effected or will be of an undesirably low order. The mole ratio of dicarboxylic acid to pentaerythritol will vary widely depending on the degree of polymerization desired. For example, in a maleic anhydride-phthalic anhydride polyester cook of the present invention, this mole ratio would be from about 1.5 to 1 to about 2.2 to 1. If a monocarboxylic acid were also employed as a chain terminator, this could, of course, change this ratio. Also, if further polymerization of the polyester was desired after substantial hydrobromination was completed, using other alcohols and glycols, the dicarboxylic acid moiety could be considerably higher to be available to react with such later added hydroxyls, or the dicarboxylic acid could be increased after hydrobromination along with the non-pentaerythritolic hydroxyl addition.

Where a polyester plasticizer of the kind described in U.S. Pat. No. 3,700,957 is being made in accordance with the present invention, the pentaerythritol is brominated and esterified using HBr and the necessary dicarboxylic acids and after substantial hydrobromination of the pentaerythritol, the chain terminators such as an alkanoic acid or alkanol are added.

The reaction is broadly carried out by techniques and conditions of the art, and these parameters are not the subject of the present invention. Even though these techniques are known, some of the factors merit attention because their adoption could lead to the best results using the invention.

The temperature of the reaction may vary widely from about 85° to about 220°C. so long as the halogenation and the polymerization occur. Preferably, the temperature is from about 115° to about 190°C. Within these limits, the reaction temperature may remain constant or be varied, depending upon equipment limitations, and the like.

The pressures will vary widely throughout the reaction and are not critical in any respect. Preferably, the reaction is run at autogenous pressure.

In this regard, examples given below bring out some of the preferred, but not limiting ratios of HBr to pentaerythritol and the carboxylic acids to pentaerythritol to insure a good fire retardant resin having desirable physical properties.

The products of the process of this invention may be suitably modified and used as is well known in the art. Thus, alkyl hydrogen phosphite and other synergists may be employed as well as promoters, stabilizers, lubricants and the like. The following examples will aid in explaining the invention but are not intended as limitations thereof.

SPECIFIC EMBODIMENTS

Example 1

Using a 2-liter glass resin flask equipped with a stirrer and a partial condenser in series with a distilling head, 186 g. (1.9 moles or 3.8 equivalents) of maleic anhydride, 281 g. (1.9 moles or 3.8 equivalents) of phthalic anhydride, and 250 ml. of tetrachloroethylene were charged to the reactor. The mixture was heated to 120°C. under a nitrogen atmosphere, with cold water being circulated through both the partial condenser and distilling head. To the heated stirred mixture was added 544 g. (4.0 moles or 16.0 equivalents) of pentaerythritol. Hydrogen bromide was introduced slowly through an HBr sparge pipe during a period of 5 hours at 104°–106°C. The cooling water was removed from the partial condenser and the tetrachloroethylene allowed to distill off during a period of about 1.5 hours. The reaction temperature was allowed to rise to 115°C. while HBr addition was continued for another 2.5 hours. The total amount of anhydrous hydrogen bromide added to the system was 723 g. (8.93 moles or equivalents).

Atmospheric steam (100°C) was introduced to the partial condenser, the $N_2$ sparge rate was set at 150 cc./min., and water was allowed to distill out of the mixture. The reaction temperature was increased during 2 hours to 185°C. and was held there for 3.5 hours. The acid number at the end of this time was 29.0. Hydroquinone (0.76 g.) was added to the mixture and the mixture was poured into a Teflon lined cookie sheet to cool. A solution of this resin (70 g. and 30 g. of styrene monomer) had a Gardner viscosity of Z-5 (ASTM-D-154-47) and a Gardner color of 3.

During the reaction, 66 g. (0.82 moles) of anhydrous, gaseous HBr passed through the system and was trapped in a water scrubber. The water (140 ml.) that was distilled from the reaction contained about 0.8 g. (0.01 mole) of HBr. Hydrogen bromide efficiency was 91%. The resin was analyzed and found to contain 42.1% bromine. It is to be noted that the HBr that passed over into the water trap (0.82 mole) is recycleable and does not represent a loss. This HBr could also be maintained in the reactor by applying a back pressure to the system. By employing either recycle or back pressure, the HBr efficiency will approach 100%. This is applicable to the HBr efficiencies shown in the succeeding examples.

Example 2

The resin flask was charged with 544 g. (16.0 equivalents) of pentaerythritol, 200 ml of tetrachloroethylene and 14.4 g. (0.24 equivalent) of glacial acetic acid. The mixture was heated with stirring to 95°C. and 695 g. (8.6 equivalents) of anhydrous HBr sparged in during a period of about six hours at 100°–115°C. A mixture of 281 g. (3.8 equivalents) of phthalic anhydride and 186 g. (3.8 equivalents) of maleic anhydride was then added to the stirred mixture. The temperature was raised to 185°C. over a period of 2 ¼ hours, during which the tetrachloroethylene distilled out along with 111 ml. of water. The mixture was heated at 185°C. until the acid number reached 35.8, and an additional 89 ml. of water came off (200 ml. total). Hydroquinone (0.76 g.) was added to the resin and the mixture allowed to cool. HBr efficiency was found to be 96.5%. The resin was dissolved in styrene (70 g. resin to 30 g. styrene). The viscosity of the solution was between Z-3 and Z-4. The Gardner color of the solution was 4. Analysis of the resin gave a bromine content of 41.8%.

Example 3

The resin flask was charged with 98 g. (2 equivalents) of maleic anhydride and 140.5 g. (1.90 equivalents) of phthalic anhydride, and the mixture heated to 110°C. Approximately one-half of the pentaerythritol (total amount 544 g., 4.0 moles-16 equivalents) was added to the molten anhydrides. A very viscous solution was formed, indicating polymer formation. To this solution was added 50 ml. of 62% hydrobromic acid (0.66 moles of HBr) and the remaining pentaerythritol. Anhydrous hydrogen bromide (600 g., 7.4 moles) was passed into the reactor at a temperature of 115°–123°C. during a 1.5 hour period. An additional 98 g. (1.0 mole) of maleic anhydride and 140.5 g. (0.95 mole) of phthalic anhydride was added to the reaction mixture, and a slow sparge of nitrogen (~50 ml./min.) was initiated. The reaction was heated to 185°C. during the space of ~2.5 hours during which ~180 ml. of water distilled over. The reaction mixture was held at 185°C for an additional three hours during which an additional 36 ml. of water came across and the acid number of the polymer dropped to 36. The water that distilled out of the mixture was found to contain 0.007 moles (~0.6 g.) of hydrogen bromide. The resin (1490 g.) was found to contain 43.8 weight percent bromine, giving a bromine efficiency of >99%. Seventy grams of this resin was dissolved in 30 g. of styrene. This solution was found to have a viscosity of Z-2, and a Gardner color of 3.

Example 4

The resin flask was charged with 544 g. (4.0 moles) of pentaerythritol, 200 ml. of 62% hydrobromic acid (213 g. HBr, 2.63 moles), and 15 g. (0.25 mole) of glacial acetic acid. The mixture was heated to 88°C. and anhydrous HBr (429 g., 5.30 moles) was passed in during a 1.25 hour period. Maximum reaction temperature was 110°C. At 100°C., a mixture of 261 g. (2.66 moles) of maleic anhydride and 326 g. (1.14 moles) of tetrachlorophthalic anhydride was added to the reaction. The mixture was then heated to 185°C. during a period of 5 hours during which 282 ml. of water distilled across. The reaction was held at 185°C. for an additional 3.25 hours during which an additional 33 ml. of water came over and the acid number dropped to 42. Analysis of the water showed that a total of 0.150 moles (12.1 g.) of hydrogen bromide was lost from the system. HBr efficiency was 98%. Viscosity and color measurement were not obtained since the resin was not sufficiently soluble at 25°C.

Example 5

The procedure was the same as used in Example 4 except that 174 g. (1.14 moles) of tetrahydrophthalic anhydride was used in place of tetrachlorophthalic anhydrde. The resin was cooked to an acid number of 36. HBr efficiency was ~99%. This polyester was then dissolved in methylene chloride and brominated with elemental bromine to give a polyester containing about 51 wt. % bromine. The procedure followed herein relative to the latter reaction is shown in U.S. Pat. No. 3,708,443 in the bromination of a conventional polyester.

Example 6

Solutions of the resins prepared in Examples 1–5 were prepared from 208 g. of resin, 90 g. of styrene and 2 g. of benzoyl peroxide. The solutions were poured into 10 × 10 × ⅛ inch glass molds and cured by heating in an air oven to a temperature of 120°C. for a period of at least 4 hours. After curing was complete, the castings were removed from the molds and the Barcol hardnesses and oxygen indices determined. The results are shown in Table I.

TABLE I

| Resin | % Br | BH | Gardner Color | OI* | Viscosity** |
|---|---|---|---|---|---|
| 1 | 29.1 | 50 | 3 | 34.5 | Z-5 to Z-6 |
| 2 | 29.0 | 51 | 4 | 34.7 | Z-3 to Z-4 |
| 3 | 30.4 | 48 | 3 | 33.0 | Z-2 |
| 4 | ~29% Br, ~7.6% Cl | 49 | — | 43.4 | — |
| 5*** | 29 | 49 | 1 | 38.8 | — |

*ASTM-D-2863-70
**ASTM-D-154-47
***Prior to elemental bromination

Example 7

In a manner similar to Example 6, castings were prepared from resins consisting of 141 g. of resins (1.5), 90 g. of a nonfire retardant resin, 67.5 g. of styrene and 2 g. of benzoyl peroxide. The results are shown in Table II. Synthesis of the non-FR resin is shown in Example 8.

TABLE II

| Resin | % Br | BH | Gardner Color | OI* | Viscosity** |
|---|---|---|---|---|---|
| 8 | 0 | — | 1 | 18.5 | V |
| 1 & 8 | 19.8 | 50 | 1 | 26.9 | Z-1 to Z-2 |
| 2 & 8 | 19.7 | 50 | 3 | 26.4 | Y Z |
| 3 & 8 | 20.5 | 50 | 1 | 30.1 | X |
| 4 & 8 | 20% Br, 5% CL | 49 | 5 | 30.3 | W |
| 5 & 8*** | 19.7 | 50 | 1 | 26.9 | Z-1 to Z-2 |

*ASTM-D-2863-70
**ASTM-D-154-47
***Resin 5 sample has not been brominated with elemental bromine

Example 8

The two-liter glass resin flask was charged with 761 g. (10 m.) of propylene glycol, 441 g. (4.5 m.) of maleic anhydride, 666 g. (4.5 m.) of phthalic anhydride, and 0.47 g. of triphenyl phosphite. The mixture was heated to 150°C. and held there for 1.25 hours and then at a temperature of 195°C. during the space of 0.5 hours. The mixture was held at 185°C.–190°C. until 156 ml. of $H_2O$ was evolved and the acid number had fallen to 36.4, about 13 hours. The mixture was cooled to 140°C. and 0.50 g. (200 p.p.m.) of hydroquinone was added as an inhibitor. Styrene (622 g.) was then added to give a resin containing 75% resin - 25% styrene.

Example 9 - Synthesis of Resin from Maleic Anhydride Alone

The reactor was charged with (3.8 moles-7.6 equivalents) of maleic anhydride and heated to 110°C. under a $N_2$ atmosphere. Pentaerythritol (4 moles-16 equivalents) and 50 ml. of 62 weight percent aqueous HBr were added. Anhydrous HBr (8.5 moles-8.5 equivalents) was sparged into the mixture during a period of 1.5 hours. The mixture was then heated during a period of 4 hours to 185°C. and held at this temperature for about 1.5 hours. During this period, water was removed and the reaction was terminated when the acid number reached 49. The resin was found to contain 50.2% bromine. A solution of 208 grams of the resin and 90 g. of styrene (2 g. benzoyl peroxide) was cast into panels as in Example 6. The cured panels had a Barcol hardness of 45 and an OI of 41.6. A casting has made as in Example 7 from 141 g. of this 50.2% bromine-containing resin, 90 g. of the resin of Example 8, 67.5 g. of styrene and 2 g. of benzoyl peroxide. The uncured resin (Br content ~23%) had a Gardner color of 1 and a viscosity of ~Z. The cured resin had a BH of 51 and an OI of 29.8.

Example 10 - Synthesis of Resin from Adipic Acid

The reaction was carried out in a manner similar to Example 4, except that 167 g. (1.14 moles) of adipic acid was used in place of the tetrachlorophthalic anhydride. The resin was cooked to an acid number of 42. HBr efficiency was ~98%. The resin had a bromine content of 46.6%. The above resin (208 g.) was dissolved in 90 g. of styrene to give a slightly cloudy solution having a viscosity of ~X and a Gardner color of about 1. Benzoyl peroxide (2 g.) was added and the sample cured as in Example 6. After curing the casting was found to have a Barcol hardness of 43 and an OI of 34.5. A resin was prepared from the above resin, a non-fire retardant resin, styrene and benzoyl peroxide as in Example 7. The uncured styrenated resin had a viscosity of ~W and a Gardner color of ~1. The cured casting had a Barcol hardness of 45 and an OI of 30.1.

Example 11 - Synthesis of Resin from Chlorendic Anhydride

The resin was prepared in a manner similar to Example 4, except that 423 g. (1.14 moles) of chlorendic anhydride was used in place of the tetrachlorophthalic anhydride. The resin was cooked to an acid number of 44.5. HBr efficiency was ~98%. The resin had a bromine content of ~43 weight percent and a chlorine content of ~15 weight percent or a total halogen content of about 58%.

Example 12 - Synthesis of Resin from Isophthaloyl Dichloride

The resin flask was charged with 544 g. (4.0 moles) of pentaerythritol, 200 ml of 62% hydrobromic acid (213 g. HBr, 2.63 moles), and 15 g. (0.25 mole) of glacial acetic acid. The mixture was heated to 97°C. and anhydrous HBr (429 g., 5.30 moles) was passed in during a 1.25 hour period. Maximum reaction temperature was 105°C. At 100°C., the $N_2$ sparge rate set at 125 cc./min., and maleic anhydride (261 g., 2.66 moles) was added, and water distilled out. When the reaction temperature reached 150°C., 232 g. (1.14 moles) of isophthaloyl dichloride was added. Addition time was 20 minutes during which the temperature was allowed to climb to 185°C. The nitrogen sparge rate was increased to 375 cc./min. The mixture was maintained at 185°C. for about 4 hours during which time the acid number fell to 42, and the reaction was terminated, 0.6 g. of hydroquinone was added and the resin poured into a pan to cool. Elemental analysis showed the resin to contain 45.8 weight percent bromine and 0.19 weight percent chlorine. A casting made from 208 g. of resin and 90 g. of styrene as in Example 6 had a Barcol hardness of 50 and an oxygen index of 36.7. A casting prepared as in Example 7 had a Barcol hardness of 51 and an OI of 30.3.

Example 13 - Synthesis of Resin from Terephthalic Acid

The reaction was carried out in a manner similar to Example 4, except that 190 g. (1.14 moles) of terephthalic acid was used in place of the tetrachlorophthalic anhydride. The mixture was cooked to an acid number of about 20. Reaction time at 180°C. was ~17 hours. Elemental analysis showed the resin to contain 45.5% bromine. Castings were prepared as in Examples 6 and 7 and found to have Barcol hardnesses and OI's of 20 and 32, and 40 and 27.6, respectively.

Example 14 - Synthesis of Resin Using Two Glycols

The reaction was carried out by charging 4 moles (16 equivalents) of pentaerythritol, 0.25 mole (0.25 equivalents) of glacial acetic acid, 40 ml. of 48% aqueous HBr (0.35 mole [0.35 equivalents] of HBr) and 200 ml. of o-xylene to a 2-liter resin flask. The mixture was heated to 85°C. and 8.15 moles (8.15 equivalents) of anhydrous HBr sparged into the mixture during the space of ~2.5 hours. The mixture was then heated under a $N_2$ blanket ($N_2$ feed rate ~50 ml./min.). At a temperature of 105°C., a molten mixture of 2.66 moles (5.32 equivalents) of maleic anhydride and 1.14 moles (2.28 equivalents) of phthalic anhydride was added (~27 minute addition time). The mixture was heated to 155°C. during the space of ~2 hours during which $H_2O$ (~180 ml.) and o-xylene (~190 ml.) was allowed to distill off. At 155°C. an additional 0.7 moles (1.4 equivalents) of maleic anhydride and 0.3 mole (0.6 equivalents) of phthalic anhydride were added to the reactor, followed by the addition of 1.0 mole (2.0 equivalents) of 2,2-dimethyl-1,3-propanediol. The reaction temperature was increased to 185°C. during 30 minutes and held at 185°C. for 4 hours during which the acid number dropped to ~37. Hydroquinone (0.76 g.) was added to the reactor and the resin was poured into a pan to cool. Hydrogen bromide efficiency was ~98%. Bromine content of the resin was ~41 weight percent. A solution of 70 g. of resin in 30 g. of styrene had a viscosity of Z-4.

Example 15 - Synthesis of Resin Using Multiple Dibasic Acids

The resin flask was charged with 544 g. (4.0 moles) of pentaerythritol, 40 ml. of 48% aqueous HBr (0.35 moles of HBr), 15 g. (0.25 mole) of acetic acid and 200 ml. of perchloroethylene. The mixture was heated to ~50°C. and 8.15 moles of anhydrous HBr was sparged into the mixture during the space of ~3.7 hours. During the HBr addition the mixture reached a maximum temperature of 112°C. At 105°C., under a $N_2$ blanket, a mixture of 170 g. of azelaic acid, 304 g. of fumaric acid and 35.5 g. of phthalic anhydride was added. The mixture was then heated to 185°C., with water and perchloroethylene being distilled off, until an acid number of ~32 was reached. Hydroquinone (0.76 g.) was added and the resin was poured into a pan to cool. A solution of 70 g. of resin in 30 g. of styrene had a viscosity of Z-2 and a Gardner color of 6.

Example 16 - Synthesis of Resin from Maleic Anhydride and Phthalic Anhydride Equipment: 50 gal. glass lined, steam heated, steel reactor, equipped with a 4 inch × 10 foot glass column (no packing), a 13 sq. ft. condenser, a 10 gal. glass lined receiver. The reactor was also equipped with an air driven agitator, and a sparge pipe.

The reactor was charged with 100 lbs. of perchloroethylene, 3 lbs. of glacial acetic acid, and 136 lbs. of pentaerythritol. The reactor was heated to reflux and held for 15 minutes. The heat was turned off and 162 lbs. of anhydrous hydrogen bromide was introduced during a period of 2 hours and 10 minutes. The autogenous reactor pressure was approximately 18 psig at a reactor temperature of 116°–120°C. The reaction mixture was sampled and the pentaerythritol was found to have been converted to a mixture of bromohydrins having a weight percent composition of: monobromohydrin - 43.7%, dibromohydrin - 52.5%, tribromohydrin - 3.8%.

A mixture of 5 gal. of perchloroethylene, 49 lbs. of maleic anhydride and 59 lbs. of phthalic anhydride was heated, with melting, to 100°C. and passed into the reactor through the sparge pipe during a period of 1 hour. (No pressure on the reactor.) A slow stream of $N_2$ was started through the reactor (~500 cc/minute) and a mixture of perchloroethylene and water were removed overhead as the reactor temperature was raised slowly to 170°C. A slow stream of perchloroethylene (~21 lbs/hr) was sparged in to aid in removal of the $H_2O$. Reaction time was ~13 hours to an acid number of 32.2. The polyester was then poured into trays and allowed to cool. Total yield of resin was 348 lbs (97.2% of theory - 358 lbs).

The water that distilled overhead (50.6 lbs) was analyzed and found to contain 3.7 lbs of HBr and 1.5 lbs of acetic acid. HBr efficiency was 97.6%.

Samples were removed at various acid numbers and made up into styrenated resins. These resins were used for physical properties testing, the results of which are shown in Table III, below. The resin was found to have a number average molecular weight of 1400 as determined by boiling point elevation of acetone. Total Process time = ~ 16 hours.

reached 10. 2-Ethylhexanol that distilled across with

TABLE III

Properties of Styrenated Resins
(70g solid alkyd/30g styrene)
(30% S, 30% Br)

| Sample No. | Acid No. | Visc.[1] | Gardner[2] Color | B.H.[3] | TS[4] | TM[4] × 10⁻⁵ | FS[5] | BM[5] × 10⁻⁵ | HDT[6] | OI[7] |
|---|---|---|---|---|---|---|---|---|---|---|
| 1 | 54 | W | 1 | 47–50 | 2650 | 3.9 | 5310 | 5.8 | 59 | 34.9 |
| 2 | 44 | X | 1 | 48–50 | 4090 | 5.7 | 5890 | 5.7 | 60 | — |
| 3 | 39 | X–Y | 1 | 50–53 | 4100 | 5.5 | 6680 | 5.8 | 75 | 35.3 |
| 4 | 34.5 | X–Y | 1–2 | 49–52 | 4010 | 5.5 | 7900 | 5.8 | 73 | — |
| 5 | 32 | Y | 2 | 45–47 | 4620 | 5.6 | 10,400 | 5.1 | 66 | 36.6 |
| | | | (30% S, 21% Br)[8] | | | | | | | |
| 6 | 54 | W | 1 | 35–45 | 6160 | 3.9 | 13,600 | 3.9 | 48 | 26.2 |
| 7 | 44 | X | 1 | 50–52 | 5190 | 6.7 | 10,800 | 6.1 | 73 | — |
| 8 | 39 | W | 1 | 51–53 | 4940 | 6.3 | 12,100 | 5.5 | 67 | 27.3 |
| 9 | 34.5 | W | 1 | 50–52 | 5140 | 5.3 | 11,900 | 5.7 | 74 | — |
| 10 | 32 | X–Y | 1 | 49–51 | 5280 | 5.7 | 14,300 | 4.9 | 50 | 27.3 |
| 11 | 30 | X | <1 | 53–55 | 7570 | 5.8 | 16,200 | 6.3 | 73 | 17.9 |

[1]ASTM-D-154-47
[2]1933 Gardner Color Scale
[3]Barcol Hardness
[4]TS — Tensile Strength  TM — Tensile Elastic Modulus ASTM-D-638-64T
[5]FS — Flexural Strength  BM — Bending Modulus ASTM-D-790-66
[6]Deflection Temperature — 18.5 cm² fiber stress ASTM-D-648-56 (1961)
[7]ASTM-D-2863-70. The OI was taken only on samples shown.
[8]Samples prepared by blending samples 1–5 with appropriate amounts of sample 11, a propylene glycol-maleic anhydride-phthalic anhydride resin (Example 8).

Example 17 - Polyester Plasticizer

Using a 2-liter glass resin flask equipped with a stirrer and a partial condenser in series with a distilling head, 272 g (2 moles) of pentaerythritol, 28.6 g of adipic acid (0.2 mole), 42.2 g. of 48% aqueous hydrogen bromide (0.25 m. of HBr), and 185 ml of tetrachloroethylene were charged to the reactor. The mixture was heated to 95°C under a nitrogen atmosphere, with cold water being circulated through both the partial condenser and the distilling head. To the heated, stirred mixture, anhydrous HBr (305 g, 3.77 moles) was slowly sparged in during a period of 1 hour at a reaction temperature of 97°–101°C. The mixture was sampled when the addition was completed and the composition with respect to the bromohydrin moiety was found to be 53.2 weight percent monobromohydrin, 43.8 weight percent dibromohydrin, and 2.9 weight percent tribromohydrin.

To the mixture was added 554.8 g (3.8 moles) of adipic acid and the cooling water on the partial condenser was replaced with atmospheric steam. The mixture was heated and water and tetrachloroethylene was allowed to distill overhead. When the reaction temperature reached 150°C, 573 g (4.4 moles) of 2-ethylhexanol was added to the mixture. The reaction maintained at this temperature until the acid number reached 10. 2-Ethylhexanol that distilled across with the water was returned to the reaction mixture.

Upon completion of the reaction excess 2-ethylhexanol was removed by applying a vacuum to the reactor. The mixture was stripped to a temperature of 185°C. and 5 torr.

The reaction product (1450 g) was found to have a density of 1.17 g/ml, a viscosity of F, and acid number of 7.9, and a mean molecular weight of 616.

Example 18

A series of test samples were prepared, using the plasticizer prepared in Example 17, by blending the plasticizer and Ferro 1828 Thermal Stabilizer into polvinyl chloride in a Brabender at a temperature of 150°–170°C. The blended resin was then molded into a sheet (1/16 inch) at a press temperature of 170°–180°C and pressure of 40,000 psi. The physical properties of the samples are shown in Table IV. All samples contained 3 phr of thermal stabilizer.

TABLE IV

MECHANICAL PROPERTIES OF POLYESTER PLASTICIZED PVC

| Sample No. | Phr | Tensile[1] Strength | %[1] Elongation | Modulus[1] (psi at 100%) | Hardness (Shore-A) | OI[3] |
|---|---|---|---|---|---|---|
| 1 | 50 | 2826 | 642 | 1499 | 93 | 30.0 |
| 2 | 56 | 2696 | 770 | 1147 | 90 | 30.3 |
| 3 | 62.5 | 2449 | 800 | 939 | 87 | 28.8 |
| 4 | 70 | 2225 | 812 | 765 | 84 | 28.3 |
| Plastolein[4] 9722 | 62.5 | 2162 | 482 | 1070 | 81 | 24.6 |

[1]ASTM-D-412
[2]Shore-A
[3]ASTM-D-2863-70
[4]Trade name of Emery Industries - a commercial polyester plasticizer.

Example 19 - Polyester Plasticizer

In a manner similar to that employed in Example 17, 272 g (2 moles) of pentaerythritol, 28.6 g (0.2 m) of adipic acid, 32.5 g (4.02 moles) of HBr, 22 g of water, and 185 ml of tetrachloroethylene were reacted.

After completion of the HBr addition, 555 g (3.8 moles) of adipic acid was added and water and tetrachloroethylene were distilled out as the reaction temperature was raised to 156°C. The reaction mixture was allowed to cool to 114°C and 104 g (1 mole) of 2,2-dimethyl-1,3-propanediol, 573 g (4.4 moles) of 2-ethylhexanol-1, and 2 g of p-toluenesulfonic acid were added. The mixture was heated to 150°C and held there until the acid number reached 1.7. Excess 2-ethylhexanol was removed by stripping the mixture to a temperature of 150°C and 4 torr. The mixture was then cooled to 130°C and 0.53 g of calcium carbonate was added to neutralize the p-toluenesulfonic acid.

The reaction product (1530 g) had a Gardner color 1, a density of g/ml, a viscosity of F, and a mean molecular weight of 545. A test sample was prepared as in Example 18, blending 20 parts of the product with 100 parts of polyvinyl chloride and 40 parts of dioctyl phthalate to produce a resin having an OI of 26.2.

Example 20 - Polyester from Commercial Technical Grade Pentaerythritol

The commercial technical grade pentaerythritol employed in this experiment was analyzed and found to consist of ~80 weight percent pentaerythritol, ~20 weight percent dipentaerthyritol, and minor amounts of unidentified impurities.

Commercial pentaerythritol - 544 g, acetic acid - 15 g, aqueous 48% HBr - 50 ml, and tetrachloroethylene - 250 ml were charged to a 2-liter resin flask. The mixture was heated to 90°C and anhydrous HBr (652 g) was slowly (6 hrs) passed in. The reaction temperature was 90°–112°C.

The mixture was cooled to 100°C and the maleic anhydride - 173 g (1.77 moles) and phthalic anhydride 218 g (1.47 moles) were added. The reaction temperature was increased to 185°C while water and tetrachloroethylene were distilled from the mixture. The reaction was terminated when the acid number reached 30.

A solution of the solid resin (47.2 weight percent Br) was prepared in a manner similar to Example 6 from 140 g of resin and 60 g of styrene. The solution had a viscosity of W and a Gardner color of 4. A casting prepared from this solution was shown to have a Barcol hardness of 48, an oxygen index of 32.4, and a bromine content of ~33 weight percent.

Example 21 - Synthesis of Vinyl Ester Resin

To a 2-liter resin flask equipped with a gas sparge pipe, mechanical stirrer, thermowell, and a partial condenser with an attendant distillation head was charged 204 g (1.5 moles) of pentaerythritol, 200 ml. of tetrachloroethylene, and 30 g. (0.2 mole) of adipic acid. After purging the reactor with $N_2$ the reactor temperature was raised to 90°C and HBr (243 g, 3.0 moles) sparged in as rapidly as it was absorbed by the mixture (about 3 hours). Analysis of the reaction mixture showed the neopentyl moiety to have a composition of about 55 weight percent monobromohydrin, 43 weight percent dibromohydrin, and 2 weight percent tribromohydrin. Adipic acid (191 g, 1.3 moles) was then added and the mixture heated during a period of about 6 hours while tetrachloroethylene and water were removed, and the acid number dropped to about 30 at a reaction temperature of 185°C. Propylene glycol (76 g, 1 mole) was then added and the reaction continued until the acid number dropped to about 8. The mixture was cooled to 85°C and 1,2-dichloroethane (500 ml), methacrylic acid (189 g, 2.2 moles), 2 g of p-methoxyphenol, and 5 ml of concentrated sulfuric acid were added. The mixture was refluxed overnight, during which about 30 g of water azeotroped off.

The product was isolated in the following manner. The dichloroethane solution was washed 4 times with 500 ml portions of water to remove unreacted methacrylic acid and sulfuric acid, and then with dilute 5% sodium bicarbonate solution to neutralize residual acid. The solution was then dried over $CaCl_2$, filtered, and the solvent stripped off under vacuum. The viscous product weighed 852 g and contained about 29.5 weight percent Br. This material was dissolved in styrene (400 g) and inhibited with 0.5 g of p-methoxyphenol. The final solution had a viscosity of W, and a bromine content of about 21 weight percent. A sample of this solution was cured between glass plates (200 g solution, 2 g benzoyl peroxide) to yield an infusible solid; Barcol hardness - 48. The oxygen index of the casting was found to be about 31.5.

The following shows the unexpected superior physical properties of brominated pentaerythritolic resin made using the subject invention. Both the resin made by prior art methods and by the present invention have the same basic composition but the properties are different as shown by the tensile strength of the castings.

Example 22 - Comparison of Product of this Invention with Product Prepared by Two Step Process A. Two Step Process A 2-1 resin flask was charged with maleic anhydride (284 g, 2.9 moles) and phthalic anhydride (428 g, 2.9 moles) and heated to 120°C to melt the anhydrides. Commercial polyester grade dibromoneopentyl glycol (gas liquid chromatography analysis showed the material to be about 5 weight percent monobromohydrin, 82 weight percent dibromohydrin, and 13 weight percent tribromohydrin,) (1570 g, 6 moles) was charged to the reactor and the reaction temperature raised to 185°C during a 1½ hour period and held there until the acid number of 33 was obtained. Seventy-four ml of water was collected overhead. Hydroquinone (1.15 g) was added and the mixture cooled.

B. This Invention

In a manner similar to Example 2 a resin was prepared from 6 moles of pentaerythritol, 12.4 moles of hydrogen bromide, 2.9 moles of maleic anhydride, 2.9 moles of phthalic anhydride.

The reaction was carried out by adding the pentaerythritol and tetrachloroethylene to the reactor and heating to 60°C. The HBr was slowly passed in during a period of about 4.5 hours at a reaction temperature of 108°–113°C. Gas liquid chromatography showed the neopentyl moiety to be present in the composition 43.1 weight percent monobromohydrin, 53.6 weight percent dibromohydrin, and 4.2 weight percent tribromohydrin. The anhydrides were added and the temperature was raised to 185°C during the space of about 3 hours: tetrachloroethylene and water distilled out. The reaction was held at 185°C. for an additional 6 hours to give an acid number of 34. The mixture was cooled after adding hydroquinone (1.2 g).

Samples of Resins A and B were dissolved in styrene (220 g of solids, 81 g styrene, 2 g benzoyl peroxide catalyst) and cast into ⅛ inch plates. Solution A, the resin prepared from Resin A, had a viscosity at 25°C of Y, while solution B, from Resin B, had a viscosity of Z-2. The casting prepared from Resin A had a tensile strength of 3375 ± 416 psi, while the casting prepared from Resin B had a tensile strength of 4858 ± 889 psi. Tensile strength run by ASTM-D-638-64T.

Example 23 - High Temperature Synthesis of Brominated Pentaerythritolic Polyester Resin A 2 liter Teflon lined stirred pressure vessel equipped with a sparge pipe, thermowell, a steam heated partial condenser followed by a distilling head and water cooled condenser, was charged with 136 g (1 mole) of pentaerythritol, 70 g (0.6 mole) of fumaric acid, and 44 g (0.3 mole) of adipic acid. The reactor was evacuated and cooled in an ice water bath and 162 g (2.0 moles) of anhydrous hydrogen bromide added through the sparge pipe.

The reactor was then heated with an oil bath to 180°C under autogenous pressure for a period of one hour, the final reaction pressure was about 70 psig. The partial condenser was heated to about 160°C and water allowed to distill overhead.

As the rate of water evolution slowed, the pressure in the system fell to one atmosphere. A slow stream of nitrogen was passed through the mixture to aid in water removal. The reaction was terminated when about 110 gram of water had distilled overhead (~86% of theory). The total reaction time was about eight hours.

The reaction mixture was cooled to 140°C, inhibited with 0.1 g of hydroquinone, and poured out to cool.

The resin (acid number = 36) had a bromine content of about 45 weight percent. HBr efficiency was about 98%.

The above resin (208 g) was dissolved in 90 g of styrene to give a solution having a viscosity of about γ and a Gardner color of 3. Benzoyl peroxide (2 g) was added and the sample cured as in Example 6. The cured casting was found to have a Barcol hardness of 48 and oxygen index of 33.4.

Comparative Example A

To show the poor efficiencies with respect to HBr, time, and energy, this example (comparative A) is included. It points out the necessity of two steps and embodies the closest prior art known to the inventors in the manufacture of brominated pentaerythritolic polyesters.

Using a 50 gallon glass lined reactor equipped with a 4 inch by 10 foot glass column (no packing), a 13 ft.$^2$ condenser, a 10 gallon glass lined receiver and a 2-stage jet for vacuum, 80 pounds of perchloroethylene, 1½ pounds of adipic acid, and 115 pounds of pentaerythritol were charged to the reactor in that order. The temperature was raised to 110°C. and 172 pounds of anhydrous HBr was fed into the reactor at the maximum rate while holding the temperature at 110° to 117°C. and the pressure at 5 to 20 p.s.i.g.

The HBr was added in 3 hours and 15 minutes while holding the temperature at 110° to 117°C. and the reaction mixture held while stirring for an additional 50 minutes at the same temperatures.

The HBr and perchloroethylene were then stripped off at 110° to 105°C. at 25 mm. After stripping, the reactor was blanketed with nitrogen and sampled. 300 ml. of dibromooxetane were added to neutralize the remaining acid and the product allowed to stir for 20 minutes at 100°C.

The product was then added to a flaker and 214 pounds of white flake product having the following analysis were recovered: monobromopentaerythritol - 4.0 weight percent; dibromoneopentyl glycol - 82.0 weight percent; and tribromoneopentyl alcohol - 13.9 weight percent. The HBr efficiency was ~72%.

The 50 gal. reactor described in Example 16 was charged with 67 lbs. of perchloroethylene, heated to 60°C, and 36.75 lbs. of maleic anhydride and 55.5 lbs. of phthalic anhydride. The reaction mixture was kept under a nitrogen blanket. The reaction mixture was heated to 80°C and 197 lbs. of dibromoneopentyl glycol, prepared as described in the preceding paragraph, was charged. The reaction mixture was heated as rapidly as possible to 170°C, with a slow stream of $N_2$ passing through the reactor (~500 cc/min.). A slow stream of perchloroethylene (~21 lbs./hr.) was sparged in to aid in removal of the water. The perchloroethylene feed was stopped about 1 hour prior to completion of the reaction. Reaction time was about 16 hours to an acid number of 34.7. The reaction mixture was inhibited with 20 g. of hydroquinone and then poured into trays and allowed to cool. The total yield of resin was about 265 lbs. (~97% of theory).

The resin was found to have a number average molecular weight of 1300 as determined by boiling point elevation in acetone. A solution of 70 g of resin in 30 g of styrene had a viscosity of Z-1, and a Gardner color of 2.

Overall HBr efficiency = 70%

Overall process time = >24 hours

We claim:

1. A process for preparing brominated pentaerythritolic polyesters comprising reacting pentaerythritol with hydrogen bromide and a dicarboxylic acid having at least 4 carbon atoms in the molecule, in the liquid phase, at a temperature of from about 85° to about 220°C., the water produced in the reactions being removed at such a rate that the weight ratio of hydrogen bromide to water in the reaction mixture is at least about 0.9 until the hydrobromination is substantially complete, at a mole ratio of hydrogen bromide to pentaerythritol of from about 1.8 to 1 to about 2.4 to 1.

2. The process of claim 1 wherein the reaction mixture is contacted with up to about 0.80 mole of a saturated monocarboxylic acid per mole of pentaerythritol.

3. The process of claim 1 wherein the dicarboxylic acid has from 4 to 20 carbon atoms in the molecule.

4. The process of claim 1 wherein the dicarboxylic acid consists at least in part of maleic acid.

5. The process of claim 1 wherein the temperature is from about 115° to about 190°C.

6. The process of claim 1 wherein the water produced in the reactions is removed from the reaction mixture so that the hydrogen bromide to water weight ratio remains above about 1.2.

7. The process of claim 1 wherein the dicarboxylic acid comprises maleic and phthalic anhydride.

8. The process of claim 2 wherein the monocarboxylic acid is acetic or propionic and is used in a mole ratio to pentaerythritol of from about 0.08 to 1 to about 0.40 to 1.

9. The process of claim 1 wherein the pentaerythritol contains dipentaerythritol.

10. The process of claim 1 wherein the dicarboxylic acid consists of a saturated aliphatic acid having up to 20 carbon atoms in the molecule and wherein after the hydrobromination reaction is substantially complete, alcohols or glycols having up to 10 carbon atoms in the molecule are added to the reaction mixture.

11. The process of claim 1 wherein after the hydrobromination reaction is substantially complete, glycols having up to 10 carbon atoms in the molecule are added to the reaction mixture to produce a polyester having both ends capped by a hydroxyl, and acrylic or methacrylic acid is added to the reaction mixture to react with the end capping hydroxyls.

12. A brominated pentaerythritolic polyester made by the process of claim 7.

13. A brominated pentaerythritolic vinyl polyester made by the process of claim 11.

14. A brominated pentaerythritolic plasticizer made by the process of claim 10.

15. The process of claim 1 wherein an inert solvent is added to the reaction mixture.

16. The process of claim 15 wherein the inert solvent is selected from the group consisting of perchloroethylene, water, xylene, toluene, ethylene dibromide, ethylene dichloride, tetrachloroethane, 1,2-dichloroethane and chlorobenzene.

17. The process of claim 16 wherein the solvent is perchloroethylene or water.

18. The process of claim 1 wherein the dicarboxylic acid comprises maleic and tetrahydrophthalic anhydride.

19. The process of claim 1 wherein the dicarboxylic acid comprises maleic and tetrachlorophthalic anhydride.

20. The process of claim 1 wherein the dicarboxylic acid comprises maleic and chlorendic anhydride.

* * * * *